US012694692B2

(12) United States Patent
Barth et al.

(10) Patent No.: US 12,694,692 B2
(45) Date of Patent: Jul. 28, 2026

(54) METHODS AND SYSTEMS FOR DETERMINING A STATE INDICATING WHETHER A SEAT BELT OF A VEHICLE IS USED

(71) Applicant: Aptiv Technologies AG, Schaffhausen (CH)

(72) Inventors: Alexander Barth, Wermelskirchen (DE); David Schiebener, Mettmann (DE)

(73) Assignee: Aptiv Technologies AG, Schaffhausen (CH)

( * ) Notice: Subject to any disclaimer, the term of this patent is extended or adjusted under 35 U.S.C. 154(b) by 315 days.

(21) Appl. No.: 18/152,580

(22) Filed: Jan. 10, 2023

(65) Prior Publication Data

US 2023/0222814 A1 Jul. 13, 2023

(30) Foreign Application Priority Data

Jan. 13, 2022 (EP) .................................... 22151397

(51) Int. Cl.
*G06V 20/59* (2022.01)
*G06V 10/764* (2022.01)
*G06V 40/20* (2022.01)

(52) U.S. Cl.
CPC .......... *G06V 20/593* (2022.01); *G06V 10/764* (2022.01); *G06V 40/28* (2022.01)

(58) Field of Classification Search
CPC .... G06V 20/593; G06V 40/28; G06V 10/764; G06V 20/59; G06T 2207/30268; B60R 22/48; B60R 2022/4816
See application file for complete search history.

(56) References Cited

U.S. PATENT DOCUMENTS 10,850,702 B2 * 12/2020 Dingli ................... G06F 9/3004
10,953,850 B1 * 3/2021 Pertsel ................... B60R 22/48
(Continued)

FOREIGN PATENT DOCUMENTS

CN 110517261 A 11/2019
CN 110795969 A 2/2020
(Continued)

OTHER PUBLICATIONS

"Extended European Search Report", EP Application No. 22151397. 1, Jul. 4, 2022, 8 pages.
(Continued)

*Primary Examiner* — Shaghayegh Azima
(74) *Attorney, Agent, or Firm* — Michael P. Doerr

(57) ABSTRACT

The present disclosure relates to methods and systems for determining a state indicating whether a seat belt of a vehicle is used. A computer implemented method for determining a state indicating whether a seat belt of a vehicle is used comprises: acquiring at least one image of a portion of an interior of the vehicle; determining whether the at least one image comprises a buckle receiver; if it is determined that the at least one image comprises the buckle receiver, determining the state based on the image, and otherwise performing: extracting, from the acquired image, information related to a user of the seat belt and/or information related to a buckle of the seat belt; determining a probability of a change of the state based on the extracted information, and updating the state based on the determined probability.

19 Claims, 3 Drawing Sheets

(56) References Cited

U.S. PATENT DOCUMENTS

| | | | | |
|---|---|---|---|---|
| 10,956,759 | B1 * | 3/2021 | Pertsel | G06N 3/08 |
| 11,040,619 | B1 * | 6/2021 | Martin | B60Q 9/00 |
| 11,597,347 | B2 * | 3/2023 | George | B60R 21/01534 |
| 2007/0195990 | A1 * | 8/2007 | Levy | G06V 10/225 |
| | | | | 340/457.1 |
| 2018/0326944 | A1 | 11/2018 | Cech et al. | |
| 2019/0147262 | A1 * | 5/2019 | Kuehnle | G06Q 10/06398 |
| | | | | 340/439 |
| 2020/0298794 | A1 * | 9/2020 | Dingli | G06F 9/3004 |
| 2021/0086674 | A1 * | 3/2021 | Mihm | B60N 2/003 |
| 2021/0206344 | A1 * | 7/2021 | George | B60R 21/01544 |
| 2022/0067410 | A1 * | 3/2022 | Raz | A61B 5/7264 |
| 2022/0114817 | A1 * | 4/2022 | Gronau | G06T 7/70 |
| 2023/0222814 | A1 * | 7/2023 | Barth | G06V 20/59 |
| | | | | 382/103 |

FOREIGN PATENT DOCUMENTS

| | | | |
|---|---|---|---|
| CN | 111194283 | A | 5/2020 |
| CN | 113147664 | A | 7/2021 |
| WO | 2021204229 | A1 | 10/2021 |

OTHER PUBLICATIONS

Baltaxe, et al., "Marker-less Vision-based Detection of Improper Seat Belt Routing", 2019 IEEE Intelligent Vehicles Symposium (IV), Jun. 2019, pp. 783-789.

First Office Action regarding Chinese Patent Application No. 202211577346.9, dated Apr. 10, 2025. Translation provided by Google Translations.

Search Report regarding Chinese Patent Application No. 2022115773469, dated Oct. 13, 2025. Translation provided by Google Translate.

* cited by examiner

200

METHODS AND SYSTEMS FOR DETERMINING A STATE INDICATING WHETHER A SEAT BELT OF A VEHICLE IS USED

INCORPORATION BY REFERENCE

This application claims priority to European Patent Application Number EP22151397.1, filed Jan. 13, 2022, the disclosure of which is incorporated by reference in its entirety.

BACKGROUND

Seat belt reminder functions, which are partially legally required, may consist of two elements: a sensing unit that detects that a person is present at a given seat, and a second sensing unit that detects whether the seat belt is used.

In order to improve the overall system cost, replacing multiple sensing units by alternative solutions may be of high interest to many OEMs (Original Equipment Manufacturers). One sensing unit that can cover both elements may be a vision sensor, for example a camera.

Cameras are getting introduced in many vehicle cabins these days. Camera sensors are used, for example, for driver state sensing, e.g. drowsiness/distraction, but can also be used for other tasks if positioned in such a way that the camera can see the relevant parts of the cabin.

However, it may be difficult for cameras to observe passengers under all circumstances.

Accordingly, there is a need to provide improved methods and systems for observing the passenger.

SUMMARY

The present disclosure provides computer implemented methods, computer systems, and non-transitory computer readable mediums, including those described according to the independent claims. Example embodiments are given in the subclaims, the description and the drawings.

In one aspect, the present disclosure is directed at a computer implemented method for determining a state indicating whether a seat belt of a vehicle is used, the method comprising the steps: acquiring at least one image of a portion of an interior of the vehicle; determining whether the at least one image comprises a buckle receiver; if it is determined that the at least one image comprises the buckle receiver, determining the state based on the image, and otherwise performing the steps of: extracting, from the acquired image, information related to a user of the seat belt and/or information related to a buckle of the seat belt; determining a probability of a change of the state based on the extracted information; and updating the state based on the determined probability. The probability may be determined based on an analysis of the at least one image, for example based on a position of a hand of a user, or a trajectory of the hand of the user.

An initial state may be pre-defined as not wearing the seat belt.

In other words, if a state cannot directly, i.e. without knowledge of a previous state, be estimated based on the image(s), at least a probability of change of the state may be estimated based on the image(s), for example based on information extracted from the image(s). Thus, assuming a present state, a probability of an updated state may be determined.

According to various embodiments, the information may be extracted using an image processing method, for example using a machine learning method, for example an artificial neural network.

According to various embodiments, the extracted information may include at least one key point of at least one body part of the user. For example, the key point may be coordinates, for example three dimensional coordinates, for example in a world coordinate system, of joints of the user, for example of a shoulder joint of the user or of an elbow joint of the user or of a hand of the user.

According to various embodiments, the extracted information may include information on a position of the buckle. For example, the information on the position of the buckle may include a static position or a temporal sequence of positions (in other words: a trajectory of the buckle).

According to various embodiments, a plurality of images, for example a temporal sequence of images, may be acquired and the plurality of images may be subjected to the subsequent processing. With a temporal sequence of images, more information may be conveyed, and as such, the probability may be estimated more accurately.

The state may be or may indicate a probability of whether the seat belt is used.

The state may be "seat belt used" or "seat belt not used" or a probability distribution over these two states. The probability distribution may provide a probability, for example a value between 0 and 1 or between 0% and 100%, for each of "seat belt used" and "seat belt not used", wherein the probability may sum up to 1 or 100%.

According to an embodiment, the portion of the interior of the vehicle comprises at least one of a portion near a buckle of the seat belt or a portion near a buckle receiver of the seat belt. However, even if the portion of the interior comprises the buckle or the buckle receiver, some parts of the image may be obstructed, so that the image does not necessarily actually include or show the buckle or buckle receiver.

According to an embodiment, the computer implemented method may further comprise the following step: if it is determined that the at least one image does not comprise the buckle receiver, determining a trajectory of a hand of a user of the seat belt relative to the buckle; wherein the probability is determined based on the trajectory. The trajectory of the hand may be used to determine the probability and then to update the state, even in situations where the actual buckling or unbuckling is not visible to the camera, for example due to obstruction of portions of the buckle receiver.

According to an embodiment, the computer implemented method may further comprise the following step: if, in a case where it is determined that the at least one image does not comprise the buckle receiver, a trajectory of the hand towards the buckle receiver is determined, setting a probability of a change of the state from "unbuckled" to "buckled" higher than a probability of a change of the state from "buckled" to "unbuckled". While a trajectory of the hand towards the buckle receiver may be observed both for buckling and unbuckling, usually a longer trajectory may be observed when buckling, since the hand must grab the buckle and move it all the way to the buckle receiver. In contrast thereto, when unbuckling, a shorter trajectory of the hand may be observed, for example from a rest position near the leg to the buckle receiver.

According to an embodiment, the computer implemented method may further comprise the following step: if, in a case where it is determined that the at least one image does not comprise the buckle receiver, a trajectory of the hand away from buckle receiver is determined, setting a probability of a change of the state from "unbuckled" to "buckled" lower than a probability of a change of the state from "buckled" to "unbuckled".

According to an embodiment, the computer implemented method may further comprise the following step: if it is determined that the at least one image does not comprise the buckle receiver, classifying a pose of a hand of a user of the seat belt near the buckle; wherein the probability is determined based on the pose. The pose of the hand may be classified using any suitable classification method, for example binary classification methods, which may distinguish between two possible poses, or multiclass classification methods, which may distinguish between a plurality of possible poses. The possible classes may for example include a "grabbing" pose, an "open hand" pose, or a "hand holding buckle" pose.

According to an embodiment, the computer implemented method may further comprise the following step: if, in a case where it is determined that the at least one image does not comprise the buckle receiver, a pose of the hand is classified as a grabbing pose, setting a probability of a change of the state from "unbuckled" to "buckled" higher than a probability of a change of the state from "unbuckled" to "buckled" if an open hand pose is determined as the pose of the hand.

According to an embodiment, the computer implemented method may further comprise the following step: if it is determined that the at least one image does not comprise the buckle receiver, determining whether the buckle is located in the hand of the user; wherein the probability is determined based on whether the buckle is located in the hand of the user. In addition to the information whether the buckle is located in the hand of the user, the trajectory of the hand of the user may be used when updating the status.

According to an embodiment, the computer implemented method may further comprise the following step: if it is determined that the at least one image does not comprise the buckle receiver, determining a gaze direction of a user of the seat belt relative to the buckle; wherein the probability is determined based on the gaze direction.

According to an embodiment, the state comprises a probability of the seat belt of the vehicle being used.

In another aspect, the present disclosure is directed at a computer system, said computer system comprising a plurality of computer hardware components configured to carry out several or all steps of the computer implemented method described herein. The computer system can be part of a vehicle.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a vehicle (for example a car, a bus, a truck, or a lorry) comprising the computer system as described herein and a sensor configured to acquire the image.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

With the methods and devices according to various embodiments, visual detection of seatbelt usage of a mostly occluded person on the back seat of a car may be provided.

With the methods and devices according to various embodiments, the classification of seat belt use by vehicle occupants may be monitored using the interior sensing system by considering pre-defined criteria in the interior scene.

Every time a direct or indirect cue (in other words: criteria) related to the seat belt state is observed, the probability distribution over "on" and "off" may be updated, as described above. In that sense, re-classification may be provided potentially at every frame with a relevant observation.

BRIEF DESCRIPTION OF THE FIGURES

Example embodiments and functions of the present disclosure are described herein in conjunction with the following drawings, showing schematically.

DETAILED DESCRIPTION

Figure 1:
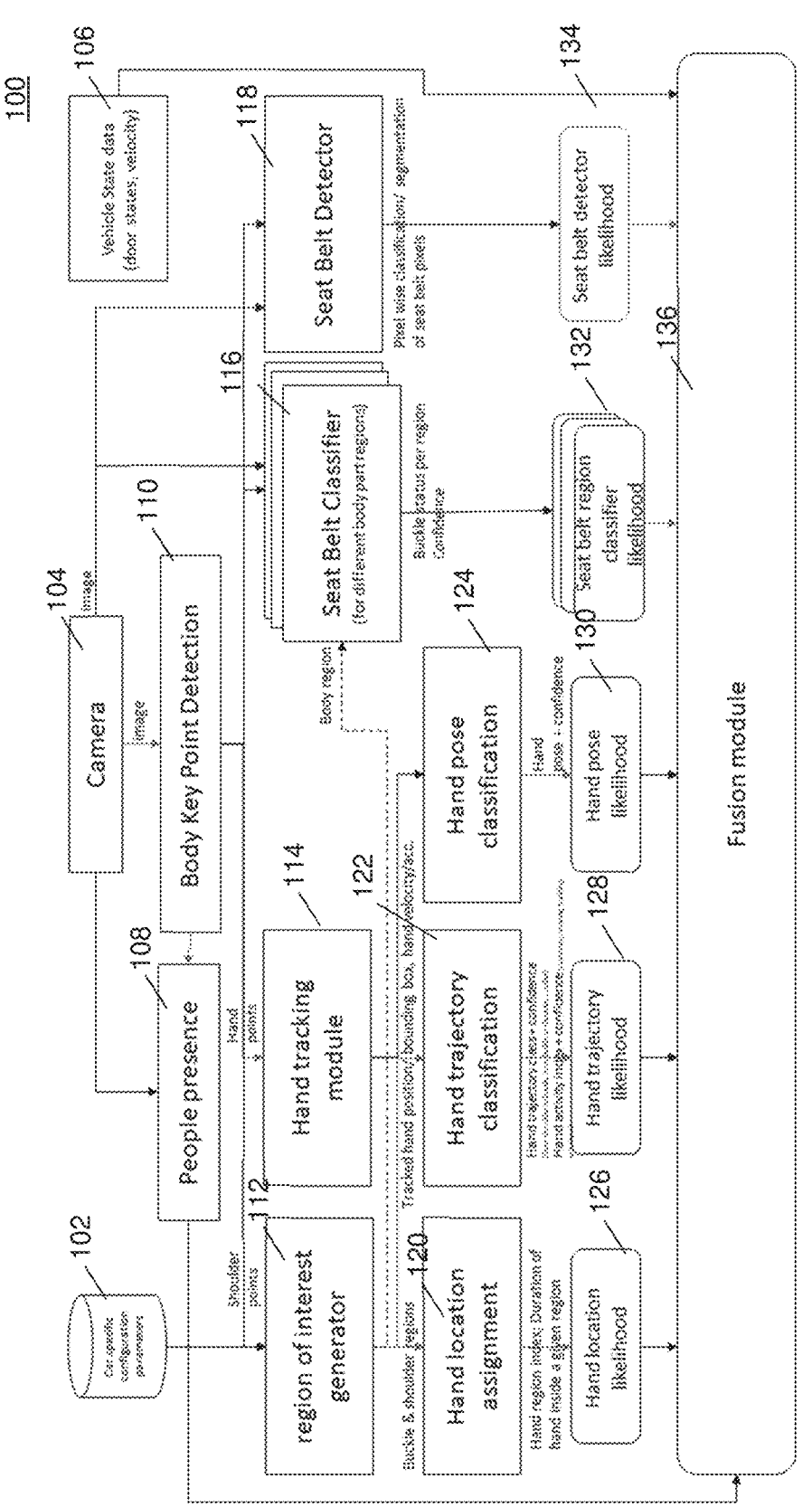
FIG. 1 an illustration of a system according to various embodiments.

The present disclosure relates to methods and systems for determining a state indicating whether a seat belt of a vehicle is used. Seat belt reminder functions, which are partially legally required, may consist of two elements: a sensing unit that detects that a person is present at a given seat, and a second sensing unit that detects whether the seat belt is used.

In order to improve the overall system cost, replacing multiple sensing units by alternative solutions may be of high interest to many OEMs. One sensing unit that can cover both elements may be a vision sensor (for example a camera).

One or more cameras may be provided around the rear view mirror, in the central console, above the dashboard, or in the roof overhead console. These positions may be summarized as front row 'central high' positions (opposed to camera positions in the A- or B-pillars, above the 2nd or 3rd seat row, etc).

According to various embodiments, a camera may be provided in such front row central high positions or any other suitable position.

From the perspective of a center high camera, passengers sitting on the left or right seat of the second row may at best be partially visible. In order to detect whether the passengers are wearing a seatbelt, a very specific approach to the problem may be provided which relies heavily on partial and indirect observation.

According to various embodiments, for the left and right seat of the second row respectively, a probability state is kept on whether the seat belt is fastened. As the seats can be considered mostly independently, details of various embodiments may be described for one seat only.

First, it may be detected when a person begins to occupy the seat. This may be realized by means of face and/or body tracking or seat region based classifiers. The detection may be performed when and shortly after the door corresponding to the seat has been open, and may also cover the case that someone switches seat from another seat of the second row to the considered one.

When a person gets onto the seat, initially one can be certain that the seat belt is off. From that point on, it may be looked for cues that may indicate the seatbelt being buckled. An example may be that the hand, maybe holding the seat belt plug, is moved to the buckle. As such cues are observed, the probability state may be modified to reflect the probability that the seatbelt is now on given the observations.

For cues that directly observe the seat belt status, a likelihood value $p_{on}$ in the range [0, 1] that the seat belt is being worn and the inverse value $p_{off}=1-p_{on}$ indicating that it is not may be defined.

For cues that only observe a potential state change (for example event of buckling/unbuckling), a similar likelihood function may be defined that relates to the likelihood of a state change for buckling or unbuckling.

Now any observed cue can be associated with conditional probabilities which indicate, given the observation, what is the probability that if we were for example in unbuckled state $p_{off}$ at the previous time step, to either stay in $p_{off}$ or switch to $p_{on}$, or if we were in buckled state $p_{on}$ to either remain in $p_{on}$ or switch to $p_{off}$. Using Bayes' theorem, the probability state about the seat belt status may thus be updated.

In the following, relevant cues to observe will be described.

For example, a direct observation of a seat belt part may be provided from the acquired image: If the camera has a line of sight to the buckle receiver region and can detect part of the seat belt in that region routed in front of the body of a person, this may increase the probability of seat belt worn significantly. It does not indicate whether the seat belt is worn correctly, so that some misuse cases such as shoulder belt running below an arm or lap belt behind the body, could not be distinguished if only the lower part of the seat belt is visible.

According to various embodiments, if a hand trajectory towards/away from seat belt is determined based on the acquired image (or the acquired images):

A hand detection module (for example body key point detection module or other implementation of hand detection) may localize the position of hands in the image.

The output of the hand detection module may be a 2D or 3D coordinate (e.g. hand center point), hand region (e.g. bounding box), or pixel-wise segmentation of the hand area.

The hands may be assigned to persons and seats in an assignment step.

A hand pose classification module may distinguish different postures of the hand, for example grabbing hand pose, open hand, or hand holding seat belt buckle.

A trajectory classification module may distinguish movements from the shoulder region towards the buckle receiver, from the buckle receiver towards the shoulder region, and other trajectories based on a sequence of images.

If the trajectory is 'towards buckle receiver', the likelihood for seat belt on may increase.

If the trajectory is 'away from buckle receiver', the likelihood for seat belt off may increase.

If the classified hand pose is 'grabbing hand', this may result in a higher likelihood compared to 'open hand'.

If the seat belt plug is detected in the hand during the movement towards the buckle (hand pose 'hand holding seat belt'), this may result in an even higher likelihood for a switch from off to on. Inversely, if it is detected during the movement away from the buckle, the likelihood for a switch from on to off may be very high.

In another variant, instead of using discrete hand poses from the classification module, the likelihood may be a function of the hand pose classification neural network's numeric outputs.

If the seat belt plug is not visible in the hand, there may be a certain probability to switch from off to on, but also to switch from on to off, depending on the direction of the hand trajectory.

If the seat belt plug is in the hand during the movement away from the buckle, this may result in a higher likelihood for a switch from on to off.

If the seat belt plug is visible in the hand, this may result in a higher probability to switch from on to off.

The relevant shoulder region may be selected by a region of interest generation model based on body key points and vehicle specific configuration data.

According to various embodiments, if moving the hand away from the buckle is determined based on the acquired image (or the acquired images):

First, the hand position in the image may be estimated, e.g. by locating key body points or an object detection approach that is able to detect hand regions.

The static buckle region may be configured in a calibration step, e.g. in form of a region of interest in the image. Alternatively, the buckle may be localized by a commonly used object detection method.

A movement away from the buckle may be expressed by an increasing relative distance of the detected hand region and the static buckle region.

According to various embodiments, if hand presence hand at the buckle receiver region is determined based on the acquired image (or the acquired images):

Hand trajectory classification may provide a hand activity classification (e.g. stationary, moving, buckle action, . . . ).

If a hand movement is observed, this may mean that the buckle button is pressed (activity class buckle action), and this may indicate a switch from on to off.

The likelihood for changing the buckle state may be proportional to the confidence of the activity classification for class "buckle action".

The likelihood for changing the buckle state may be lower if the hand is stationary all the time.

In general, every time the hand is at the buckle, there is a very small probability that the state switches from on to off or from off to on.

According to various embodiments, (the passenger) looking towards the buckle during any of these activities may slightly increase the probability of a change happening in the above cases:

A head detection module may localize an image region that contains a person's head.

The detected image region may be further analyzed to estimate the head orientation (e.g. 3 rotation angles).

The estimated head rotation parameters may be used to identify cases where the head is looking towards the seat belt buckle receiver A look on the seat belt may increase the likelihood of a seat belt state change.

According to various embodiments, a combination of a person (in other words; passenger) looking at the seat belt and his or her hand being in the region may further increases the overall likelihood of a seat belt state change.

Observation of the seat belt plug in the buckle or the seatbelt running in a reasonable location and direction may increase the confidence that the seatbelt is worn.

According to various embodiments, if moving a hand to the shoulder/above the shoulder is determined based on the acquired image (or the acquired images):

If shoulder region is visible and can be detected via a body key points detection module, the shoulder region may be dynamically placed in the image relative to the detected shoulder points.

If a body key point detection module is not available, configurable static shoulder regions may be defined.

FIG. 1 shows an illustration 100 of a system according to various embodiments. Car specific configuration parameters 102 may be provided. A camera 104 may acquire an image or a series of images. Vehicle state data 106 may for example include door states and/or vehicle velocity. A body key point detection module 110, a people presence module 108, a region of interest generator 112, a hand tracking module 114, a seat belt classifier 116, a seat belt detector 118, a hand location assignment module 120, a hand trajectory classification module 122, a hand pose classification module 124 may be provided. A hand location likelihood 126, a hand trajectory likelihood 128, a hand pose likelihood 130, a seat belt region classifier likelihood 132, and a seatbelt detector likelihood 134 may be determined and provided to a fusion module 136.

In more details, shoulder points may be provided to the region of interest generator 112, and hand points may be provided to the hand tracking module 114.

The camera 104 may provide an image (or a plurality of images) to the people presence module 108, the body key point detection module 110, the seat belt classifier 116, and the seatbelt detector.

Buckle and shoulder regions may be provided from the region of interest generator 112 to the hand location assignment module 120. The hand location assignment module 120 may provide hand region index, and/or a duration of hand inside a given region to the hand location likelihood (function) 126.

The region of interest generator 112 may provide information on body regions to the seat belt classifier 116.

The hand tracking module 114 may provide information on tracked hand position and/or bounding boxes and/or hand velocity and/or hand acceleration to the hand trajectory classification module 122 and/or the hand pose classification module 124.

The hand trajectory classification module 122 may provide a hand trajectory class (and optionally a corresponding confidence), for example from shoulder to buckle or from buckle to shoulder. and/or a hand activity index (and optionally a corresponding confidence), for example stationary, moving, buckling activity, to the hand trajectory likelihood (function) 128.

The hand pose classification module 124 may provide information on the hand pose (and optionally a corresponding confidence) to the hand pose likelihood (function) 130.

The seat belt classifier 116 may provide a buckle status per region (and optionally a corresponding confidence) to the seat belt region classifier likelihood (function) 132.

The seat belt detector 118 may provide pixel wise classification and/or segmentation of seat belt pixels to the seat belt detector likelihood (function) 134.

It will be understood that the system may include some or all the components shown in FIG. 1, but may not be limited to these.

The input data may include data from at least one camera and vehicle sensor data (e.g. door states or velocity), and some configuration parameters that may be specific to the given car model.

The likelihoods 126, 128, 130, 132, and 134 shown in FIG. 1 are the respective likelihood functions.

According to various embodiments, the hand location likelihood function may have the following properties:

High likelihood of state change if hand is detected inside the shoulder region or buckle region for some time;

Low likelihood if the hand is outside the regions for some time;

The hand location likelihood function may be a function of the duration time inside the box (for example within a certain short time period for normal operation of seat belt the likelihood is highest, for shorter or longer periods the likelihood will decrease).

The hand location likelihood function may be manually designed based on model knowledge or learned from training data.

The hand localization likelihood may only contribute to transition events and does not provide a direct measurement of the seat belt status.

According to various embodiments, the hand trajectory likelihood function may have the following properties:

If an observed trajectory is similar to (observed or modeled) buckling or unbuckling motions, the respective likelihood may be high.

Similarity may be measured in terms of the spatial trajectory as well as the speed, or may be the output of a trained regression model.

According to various embodiments, the hand pose likelihood may have the following properties:

If the hand pose during a potential buckling or unbuckling motion indicates that the buckle may be held, this may increase the likelihood of having observed a buckling or unbuckling activity.

Hand poses may be discrete hand states determined by a classifier. Each hand state may be associated with a likelihood of the hand holding a buckle.

Alternatively, a regression model may be trained to estimate the likelihood that the hand currently holds a buckle.

According to various embodiments, the seat belt classifier likelihood may have the following properties:

The classifier may classify an image region with respect to whether it contains the seatbelt or buckle.

This may be particularly relevant for the region around the buckle receiver. If the seatbelt or buckle is detected inside this region, this may increase the probability for "seatbelt on" over time.

Optionally, the buckle receiver may be classified as visible or occluded. If it is visible and no seatbelt or buckle is detected, this may increase the likelihood of "seatbelt off" over time.

According to various embodiments, the seat belt detector likelihood may have the following properties:

The detector may detect and localize the seatbelt and the seatbelt buckle.

If the buckle is detected in the buckle receiver, this may increase the likelihood for "seatbelt on" over time.

If the seatbelt is detected near the buckle receiver, this may increase the likelihood for "seatbelt on" over time.

If the buckle and/or the seatbelt are detected in or near the hand during a potential buckling or unbuckling motion, this may increase the confidence of the output of the classification of that action.

According to various embodiments, to simplify the detection/observation of the events and cues above, markers (for example IR (infrared) markers) may be provided on the seat belt plug and/or the seat belt itself.

According to various embodiments, a combination with other sensors like the buckle sensor and the seat belt extension measurement may be provided.

According to various embodiments, the system may be modeled by a Hidden Markov model where the described likelihood functions correspond to the observation likelihoods for a given state and the hidden states are at least seat belt on (buckled) or seat belt off (unbuckled). Additional states may be added for 'action to buckle', 'action to unbuckle', and 'unknown'.

Figure 2:
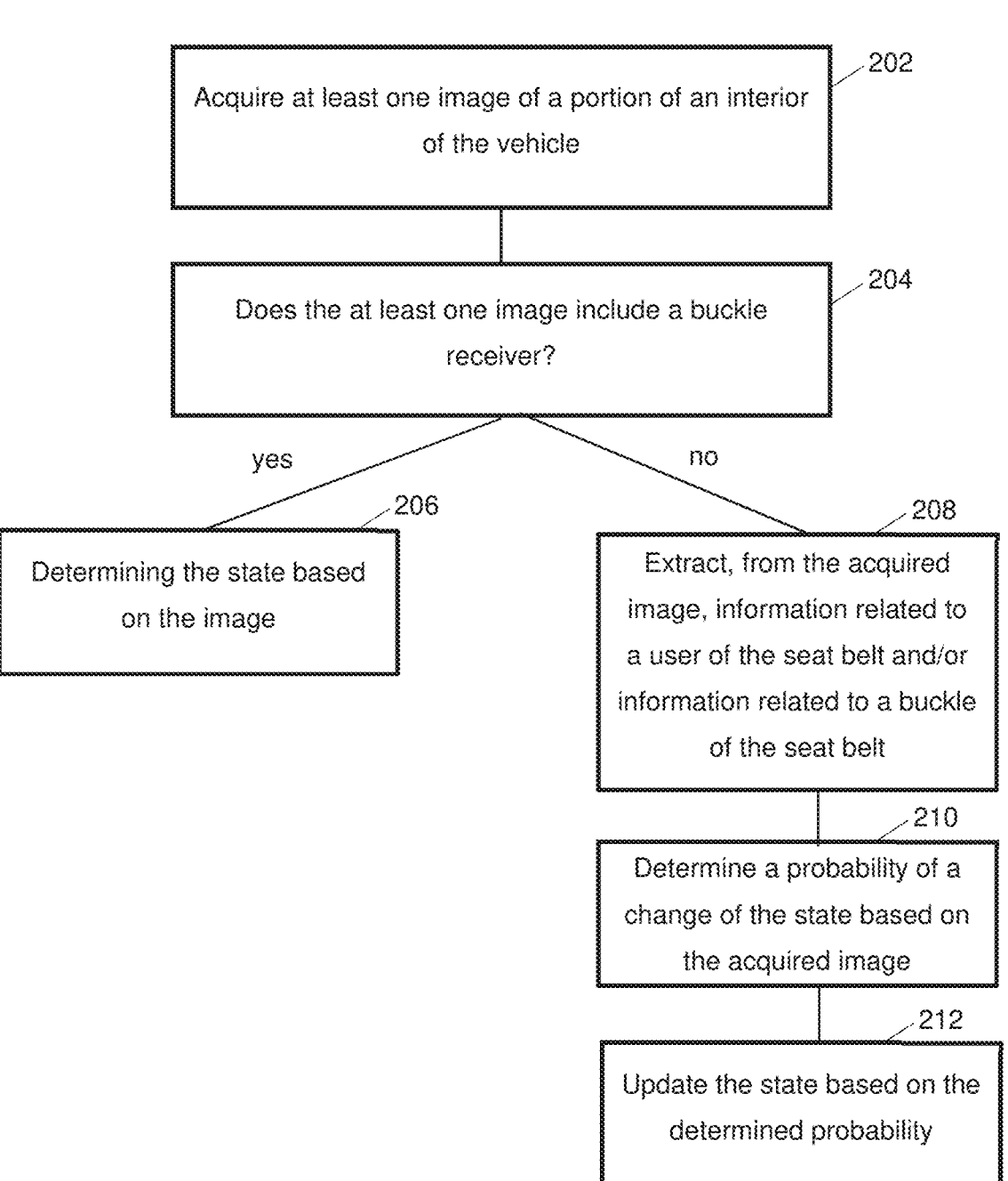
FIG. 2 a flow diagram illustrating a method for determining a state indicating whether a seat belt of a vehicle is used according to various embodiments.

FIG. 2 shows a flow diagram 200 illustrating a method for determining a state indicating whether a seat belt of a vehicle is used according to various embodiments. At 202, at least one image of a portion of an interior of the vehicle may be acquired. At 204, it may be determining whether the at least one image comprises a buckle receiver. If it is determined at 204 that the at least one image include (or show or comprises) the buckle receiver, at 206, the state may be determining based on the image. Otherwise (i.e. if it is determined at 204 that the at least one image does not include the buckle receiver), at 208, information related to a user of the seat belt and/or information related to a buckle of the seat belt may be extracting from the acquired image. Furthermore, at 210, a probability of a change of the state may be determined based on the extracted information, and at 212, the state may be updated based on the determined probability.

According to various embodiments, the extracted information may include or may be at least one key point of at least one body part of the user, and/or the extracted information may include or may be information on a position of the buckle.

According to various embodiments, the portion of the interior of the vehicle may include or may be at least one of a portion near a buckle of the seat belt or a portion near a buckle receiver of the seat belt.

According to various embodiments, if it is determined that the at least one image does not comprise the buckle receiver, a trajectory of a hand of a user of the seat belt relative to the buckle may be determined, and the probability may be determined based on the trajectory.

According to various embodiments, if, in a case where it is determined that the at least one image does not comprise the buckle receiver, a trajectory of the hand towards the buckle receiver is determined, a probability of a change of the state from "unbuckled" to "buckled" may be set higher than a probability of a change of the state from "buckled" to "unbuckled".

According to various embodiments, if, in a case where it is determined that the at least one image does not comprise the buckle receiver, a trajectory of the hand away from buckle receiver is determined, a probability of a change of the state from "unbuckled" to "buckled" may be set lower than a probability of a change of the state from "buckled" to "unbuckled".

According to various embodiments, if it is determined that the at least one image does not comprise the buckle receiver, a pose of a hand of a user of the seat belt near the buckle may be classified, and the probability may be determined based on the pose.

According to various embodiments, if, in a case where it is determined that the at least one image does not comprise the buckle receiver, a pose of the hand is classified as a grabbing pose, a probability of a change of the state from "unbuckled" to "buckled" may be set higher than a probability of a change of the state from "unbuckled" to "buckled" if an open hand pose is determined as the pose of the hand.

According to various embodiments, if it is determined that the at least one image does not comprise the buckle receiver, it may be determined whether the buckle is located in the hand of the user, and the probability may be determined based on whether the buckle is located in the hand of the user.

According to various embodiments, a gaze direction of a user of the seat belt relative to the buckle may be determined, and the probability may be determined based on the gaze direction. For example, the gaze direction may be determined using a camera system. The position of the user's eye or eyes and/or the user's head may be determined in order to determine the gaze direction. Since the coordinates of the camera may be fixed and known related to the chassis of the car, and thus also relative to the buckle, the gaze direction of the user of the seat belt relative to the buckle may be determined.

According to various embodiments, the state may include or may be a probability of the seat belt of the vehicle being used.

According to various embodiments, it is determined that the state can be estimated based on the image, the state may be determined based on the image.

Each of the steps 202, 204, 206, and the further steps described above may be performed by computer hardware components.

Figure 3:
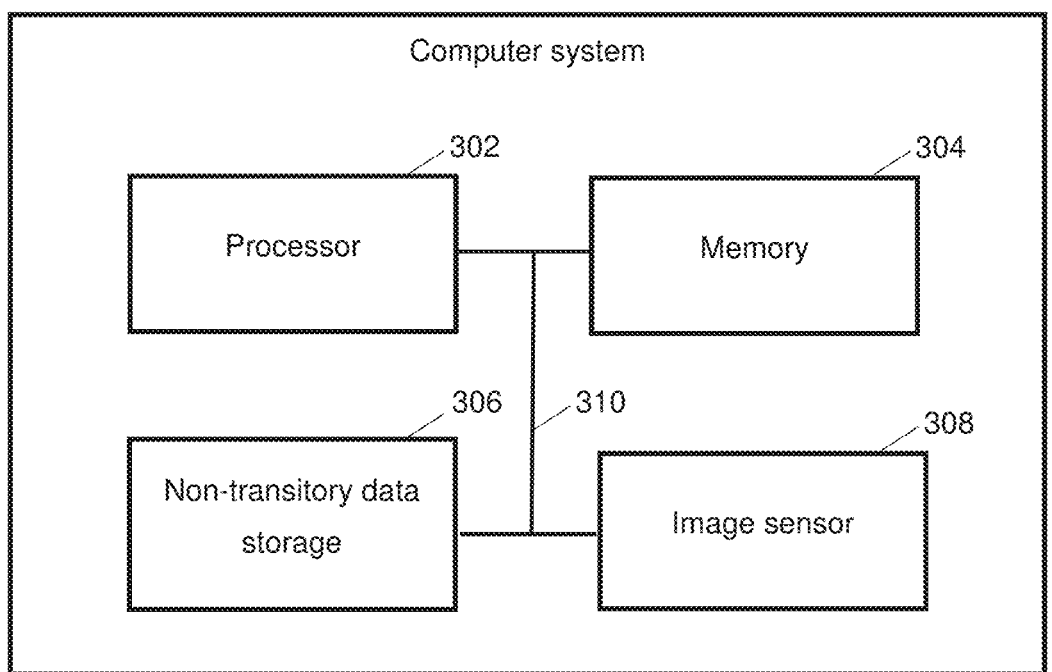
FIG. 3 a computer system with a plurality of computer hardware components configured to carry out steps of a computer implemented method for determining a state indicating whether a seat belt of a vehicle is used according to various embodiments.

FIG. 3 shows a computer system 300 with a plurality of computer hardware components configured to carry out steps of a computer implemented method according to various embodiments for determining a state indicating whether a seat belt of a vehicle is used. The computer system 300 may include a processor 302, a memory 304, and a non-transitory data storage 306. An image sensor 308 (for example a camera, a time-of-flight camera, an infrared camera, a lidar sensor or a radar sensor) may be provided as part of the computer system 300 (like illustrated in FIG. 3), or may be provided external to the computer system 300.

The processor 302 may carry out instructions provided in the memory 304. The non-transitory data storage 306 may store a computer program, including the instructions that may be transferred to the memory 304 and then executed by the processor 302. The image sensor 308 may be used for acquiring an image of a portion of an interior of the vehicle.

The processor 302, the memory 304, and the non-transitory data storage 306 may be coupled with each other, e.g. via an electrical connection 310, such as e.g. a cable or a computer bus or via any other suitable electrical connection to exchange electrical signals. The image sensor 308 may be coupled to the computer system 300, for example via an external interface, or may be provided as parts of the computer system (in other words: internal to the computer system, for example coupled via the electrical connection 310).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the computer system 300.

The use of "example," "advantageous," and grammatically related terms means "serving as an example, instance, or illustration," and not "preferred" or "advantageous over other examples." Items represented in the accompanying figures and terms discussed herein may be indicative of one or more items or terms, and thus reference may be made interchangeably to single or plural forms of the items and terms in this written description. The use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"), unless the context clearly dictates otherwise. Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, c-c-c, or any other ordering of a, b, and c).

REFERENCE NUMERAL LIST

100 illustration of a system according to various embodiments
102 car specific configuration parameters
104 camera
106 vehicle state data
108 people presence module
110 body key point detection module
112 region of interest generator
114 hand tracking module
116 seat belt classifier
118 seat belt detector
120 hand location assignment module
122 hand trajectory classification module
124 hand pose classification module
126 hand location likelihood
128 hand trajectory likelihood
130 hand pose likelihood
132 seat belt region classifier likelihood
134 seatbelt detector likelihood
136 fusion module
200 flow diagram 200 illustrating a method for determining a state indicating whether a seat belt of a vehicle is used according to various embodiments
202 step of acquiring an image of a portion of an interior of the vehicle

204 step of determining whether the state can be estimated based on the image
206 steps of, if it is determined that the state cannot be estimated based on the image, determining a probability of a change of the state based on the acquired image and updating the state based on the determined probability
300 computer system according to various embodiments
302 processor
304 memory
306 non-transitory data storage
308 image sensor
310 connection

What is claimed is:

1. A computer implemented method for determining a state indicating whether a seat belt of a vehicle is used, the method comprising the following steps carried out by a computer:

acquiring, using a camera, at least one image of a portion of an interior of the vehicle, the camera being located in a front row central high position of the vehicle that is one of at a rear-view mirror of the vehicle, in a central console of the vehicle, above a dashboard of the vehicle, or in a roof overhead console of the vehicle;

determining whether the at least one image comprises a buckle receiver;

responsive to determining that the at least one image comprises the buckle receiver, determining the state based on the at least one image; and responsive to determining that the at least one image does not comprise the buckle receiver, performing:

extracting, from the at least one image, using a machine-learning image processing method that utilizes an artificial neural network, at least one observed cue from a plurality of observed cues related to a user of the seat belt or to a buckle of the seat belt, each observed cue of the plurality of observed cues being associated with a conditional probability of the state indicating, given the observed cue, (i) whether, when the state of the seat belt is in an unbuckled state in a previous time step, the state remains in the unbuckled state or changes to a buckled state, or (ii) whether, when the state of the seat belt is in the buckled state in the previous time step, the state remains in the buckled state or changes to the unbuckled state;

determining, using Bayes' theorem, a probability of a change of the state of the seat belt based on the conditional probability associated with each of the at least one observed cue extracted from the at least one image; and updating the state of the seat belt based on the determined probability; and outputting a seat belt reminder to the user based on the state of the seat belt.

2. The computer implemented method of claim 1, wherein the at least one observed cue extracted from the at least one image relates to at least one key point of at least one body part of the user.

3. The computer implemented method of claim 1, wherein the at least one observed cue extracted from the at least one relates to a position of the buckle.

4. The computer implemented method of claim 1, wherein the portion of the interior of the vehicle comprises at least one of a portion near the buckle of the seat belt or a portion near the buckle receiver of the seat belt.

5. The computer implemented method of claim 1, wherein if it is determined that the at least one image does not comprise the buckle receiver, the method further comprises:

determining a trajectory of a hand of the user of the seat belt relative to the buckle;

wherein the at least one observed cue extracted from the at least one image includes the determined trajectory of the hand of the user.

6. The computer implemented method of claim 5, further comprising:

determining the trajectory of the hand towards the buckle receiver; and setting the associated probability for the observed cue associated with the determined trajectory of the hand of the user of a change of the state from the unbuckled state to the buckled state higher than a probability of a change of the state from the buckled state to the unbuckled state.

7. The computer implemented method of claim 5, further comprising:

determining the trajectory of the hand away from the buckle receiver; and setting the associated probability for the observed cue associated with the determined trajectory of the hand of the user of a change of the state from the unbuckled state to the buckled state lower than a probability of a change of the state from the buckled state to the unbuckled state.

8. The computer implemented method of claim 1, wherein if it is determined that the at least one image does not comprise the buckle receiver, the method further comprises:

classifying a pose of a hand of the user of the seat belt near the buckle;

wherein the at least one observed cue extracted from the at least one image includes the determined pose.

9. The computer implemented method of claim 8, further comprising:

classifying the pose of the hand as a grabbing pose; and setting the associated probability for the observed cue associated with the determined pose of a change of the state from the unbuckled state to the buckled state higher than a probability of a change of the state from the unbuckled state to the buckled state in response to the determined pose being an open hand pose.

10. The computer implemented method of claim 1, wherein if it is determined that the at least one image does not comprise the buckle receiver, the method further comprises:

determining whether the buckle is located in a hand of the user;

wherein the at least one observed cue extracted from the at least one image includes whether the buckle is located in the hand of the user.

11. The computer implemented method of claim 1, further comprising:

determining a gaze direction of the user of the seat belt relative to the buckle;

wherein the at least one observed cue extracted from the at least one image includes the gaze direction.

12. A computer system comprising:

a plurality of computer hardware components including a processor; and a non-transitory computer readable medium comprising instructions, which when executed by the processor, cause the processor to perform operations comprising:

acquire, using a camera, at least one image of a portion of an interior of a vehicle, the camera being located in a front row central high position of the vehicle that is one of at a rear-view mirror of the vehicle, in a central console of the vehicle, above a dashboard of the vehicle, or in a roof overhead console of the vehicle;

determine whether the at least one image comprises a buckle receiver;

responsive to a determination that the at least one image comprises the buckle receiver, determine a state indicating whether a seat belt of the vehicle is used based on the at least one image; and responsive to a determination that the at least one image does not comprise the buckle receiver:

extract, from the at least one image, using a machine-learning image processing method that utilizes an artificial neural network, at least one observed cue from a plurality of observed cues related to a user of the seat belt or to a buckle of the seat belt, each observed cue of the plurality of observed cues being associated with a conditional probability of the state indicating, given the observed cue, (i) whether, when the state of the seat belt is in an unbuckled state in a previous time step, the state remains in the unbuckled state or changes to a buckled state, or (ii) whether, when the state of the seat belt is in the buckled state in the previous time step, the state remains in the buckled state or changes to the unbuckled state;

determine, using Bayes' theorem, a probability of a change of the state of the seat belt based on the conditional probability associated with each of the at least one observed cue extracted from the at least one image; and update the state of the seat belt based on the determined probability; and output a seat belt reminder to the user based on the state of the seat belt.

13. The computer system according to claim 12, wherein the at least one observed cue extracted from the at least one image relates to at least one key point of at least one body part of the user.

14. The computer system according to claim 12, wherein the at least one observed cue extracted from the at least one relates to a position of the buckle.

15. The computer system according to claim 12, wherein the portion of the interior of the vehicle comprises at least one of a portion near the buckle of the seat belt or a portion near the buckle receiver of the seat belt.

16. The computer system according to claim 12, wherein further responsive to the determination that the at least one image does not comprise the buckle receiver, the instructions further cause the processor to execute further operations to:

determine a trajectory of a hand of the user of the seat belt relative to the buckle;

wherein the at least one observed cue extracted from the at least one image includes the determined trajectory of the hand of the user.

17. The computer system according to claim 12, wherein further responsive to the determination that the at least one image does not comprise the buckle receiver, the instructions further cause the processor to execute further operations to:

classify a pose of a hand of the user of the seat belt near the buckle;

wherein the at least one observed cue extracted from the at least one image includes the determined pose.

18. The computer system according to claim 12, wherein further responsive to the determination that the at least one image does not comprise the buckle receiver, the instructions further cause the processor to execute further operations to:

determine whether the buckle is located in a hand of the user;

wherein the at least one observed cue extracted from the at least one image includes whether the buckle is located in the hand of the user.

19. A vehicle comprising:

a camera located in a front row central high position of the vehicle that is one of at a rear-view mirror of the vehicle, in a central console of the vehicle, above a dashboard of the vehicle, or in a roof overhead console of the vehicle;

a processor;

a non-transitory computer readable medium comprising instructions, which when executed by the processor, cause the processor to:

acquire, from the camera, at least one image of a portion of an interior of the vehicle;

determine whether the at least one image comprises a buckle receiver;

responsive to a determination that the at least one image comprises the buckle receiver, determine a state indicating whether a seat belt of the vehicle is used based on the at least one image; and responsive to a determination that the at least one image does not comprise the buckle receiver:

extract, from the at least one image, using a machine-learning image processing method that utilizes an artificial neural network, at least one observed cue from a plurality of observed cues related to a user of the seat belt or to a buckle of the seat belt, each observed cue of the plurality of observed cues being associated with a conditional probability of the state indicating, given the observed cue, (i) whether, when the state of the seat belt is in an unbuckled state in a previous time step, the state remains in the unbuckled state or changes to a buckled state, or (ii) whether, when the state of the seat belt is in the buckled state in the previous time step, the state remains in the buckled state or changes to the unbuckled state;

determine, using Bayes' theorem, a probability of a change of the state of the seat belt based on the conditional probability associated with each of the at least one observed cue extracted from the at least one image; and update the state of the seat belt based on the determined probability; and output a seat belt reminder to the user based on state of the seat belt.

* * * * *